United States Patent [19]

Gellert

[11] 4,376,244
[45] Mar. 8, 1983

[54] INJECTION MOLDING HEATED PROBE

[76] Inventor: Jobst U. Gellert, 7A Prince St., Glen Williams, Ontario, Canada

[21] Appl. No.: 262,302

[22] Filed: May 11, 1981

[30] Foreign Application Priority Data

May 8, 1981 [CA] Canada .................................. 377228

[51] Int. Cl.³ .............................................. H05B 3/06
[52] U.S. Cl. ................................... 219/523; 219/530; 222/146 HE; 425/549; 425/566
[58] Field of Search ............... 219/277, 316, 381, 403, 219/415, 437, 523, 530, 540, 544, 552; 425/144, 547, 548, 549, 566, 568, 567; 165/105; 222/146 HE; 338/240

[56] References Cited

U.S. PATENT DOCUMENTS

| 4,033,485 | 7/1977 | Kohler | 222/146 HE |
| 4,279,588 | 7/1981 | Gellert | 425/568 |
| 4,303,382 | 12/1981 | Gellert | 425/566 |
| 4,304,544 | 12/1981 | Crandell | 425/549 |
| 4,330,258 | 5/1982 | Gellert | 425/564 |

Primary Examiner—Volodymyr Y. Mayewsky
Attorney, Agent, or Firm—Riches, McKenzie & Herbert

[57] ABSTRACT

This invention relates to an integral heated probe for plastic injection molding and a method of making the same. The probe has an elongated steel outer body with a cylindrical well extending to a pointed tip end. An electrical cartridge heater member positioned in the well with the leads extending out the open end. The space adjacent the pointed tip end and all around the cartridge heater is filled with copper to improve heat transfer between the heater member and the outer body. The copper fusing is performed by two-stage heating in a vacuum furnace. First a slug of copper is inserted into the well and heated to melt it into the pointed tip end. Then the heater member is inserted into the well through a sleeve of copper at the top and heated to melt the copper. The copper flows down around the heater member and fuses to it, the outer body and the previously inserted copper. Melting the copper under a partial vacuum ensures that the copper flows into all the spaces displacing the air and fusion bonding to the heater member and the outer body to improve heat transfer between them.

5 Claims, 6 Drawing Figures

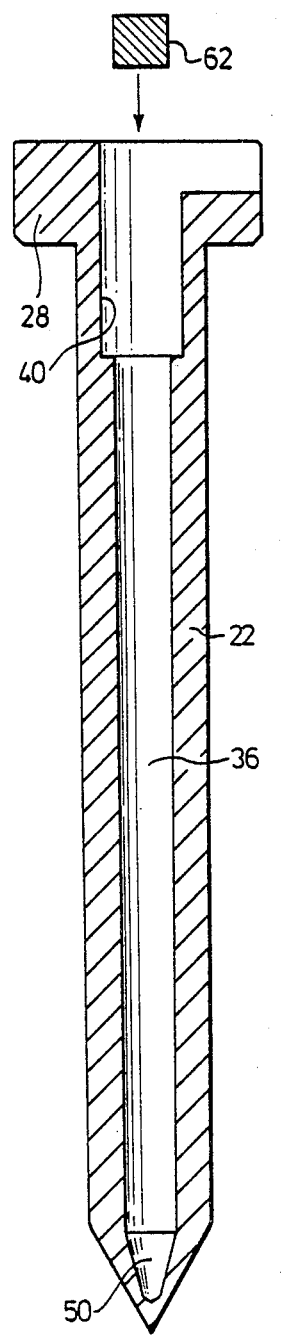
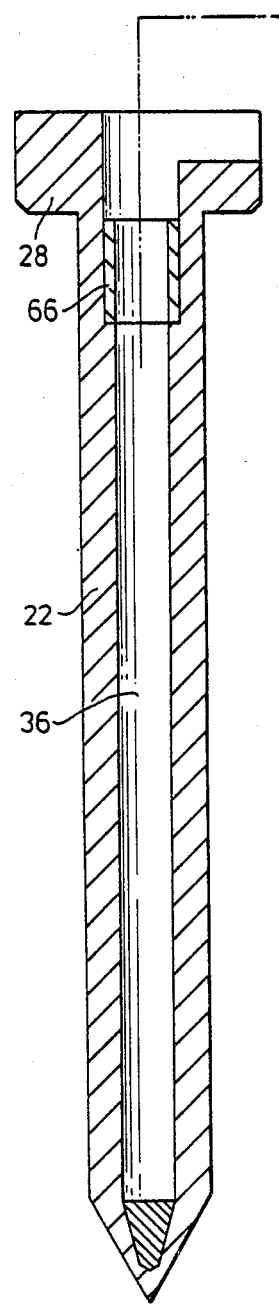
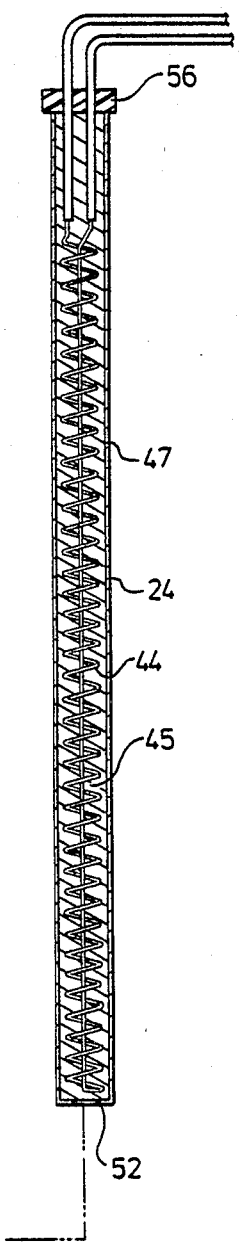
FIG.2.   FIG.3.

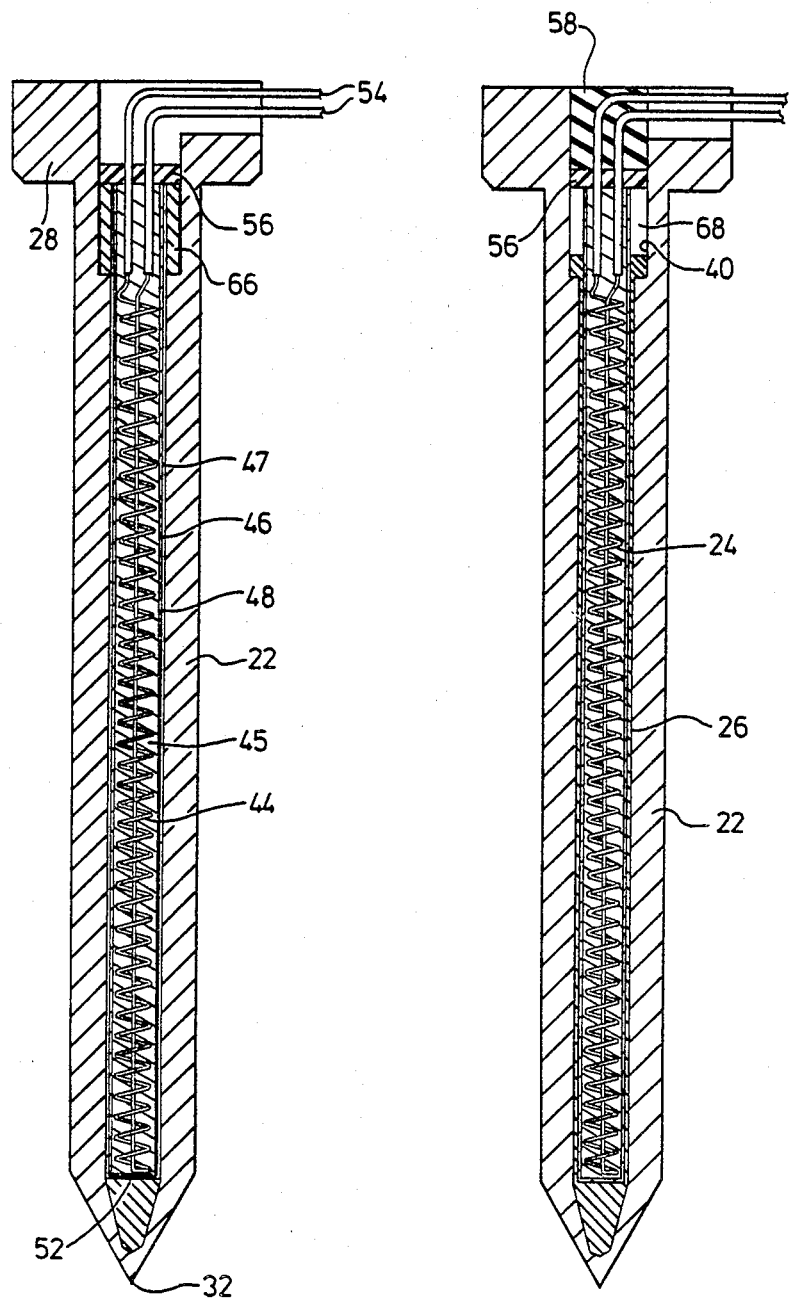

INJECTION MOLDING HEATED PROBE

BACKGROUND OF THE INVENTION

This invention relates to an integral heated probe for injection molding and a method of making the same.

In the past, it has been well known to make cartridge type heaters by running electrical heating wires through a heat transfer material in a casing and then swaging to compact the material, elminating voids which improves heat transfer. An illustrative example of this method and structure may be found in U.S. Pat. No. 2,831,951 which issued Apr. 22, 1958 to the Watlow Electric Manufacturing Company.

More recently, this concept has been adapted to provide a heated probe which extends into a hot runner passage to maintain the temperature of pressurized melt flowing longitudinally around it towards a gate. In such an application, heat transfer away from the electrical heating wires or element and to the outer casing are, of course, very important. If heat is not transferred quickly and adequately away all along the heating element it will develop a "hot spot" and burn out necessitating replacement. Furthermore, it is desirable that the outer casing be maintained at a substantially constant temperature along its length to improve the efficiency of heat transfer to the surrounding melt as well as to avoid any melt deterioration due to overheating, particularly with engineering or other difficulty to mold materials. Some of these probes are formed by inserting a swaged cylindrical cartridge type heater into a hollow outer torpedo body, but this has the disadvantage that the outer body must be made large enough to receive the cartridge heater which leaves a void or air space therebetween. While this has the advantage that burnt out cartridge heaters may be quickly replaced, it has the disadvantage that the air space acts as an insulator.

Attempts have been made to overcome this problem by inserting a conical shaped heater in a tapered hole, and even by providing a split sheath heater. However, while these are better, they still leave a considerable amount of insulative air space.

Another attempt to overcome this difficulty is shown in U.S. Pat. No. 3,970,821 which issued July 20, 1976 to Fast Heat Element Manufacturing Co., Inc. which discloses a heated probe which is made by swaging the torpedo body or casing directly over the magnesium oxide through which the heating element extends. While this does reduce the amount of insulative air space, it does not provide a satisfactory balance of heat transfer between the sides and the tip of the probe. There is considerably more heat transfer directly to the sides of the probe than the magnesium oxide powder which allows to the tip of the probe.

SUMMARY OF THE INVENTION

Accordingly, it is an object of the present invention to at least partially overcome the disadvantages of the prior art by providing a novel heated probe and method of making the same which facilitates heat transfer to the outer body, particularly adjacent the tip end.

To this end, in one of its aspects, the invention provides an integral elongated hollow heated probe to extend centrally into a portion of a hot runner passage wherein pressurized melt flows longitudinally past the probe to a gate leading to a cavity, the elongated heated probe comprising: (a) an elongated hollow outer body having first and second ends, the body member defining a well extending from the first end to an enclosed pointed tip extending in the direction of flow at the second end, the well having a generally cylindrical inner wall, but ending at a generally conical portion adjacent the tip at the second end, the first end having means for locating the heated probe in position extending into the hot runner passage, (b) an elongated inner heated member seated in the well in the outer body, the heater member having an electrical heating element connected to external lead means, the heating element extending through a heat transfer material in a generally cylindrical outer casing, the outer casing having a slightly smaller outside diameter than the inside diameter of the inner wall of the well in the outer body thereby forming a space therebetween, and (c) a highly conductive material substantially filling the conical portion of the well adjacent the tip of the outer body and the space between the outer casing of the heater member and the inner wall of the well.

In another of its aspects, the invention provides a method of manufacturing an integral elongated heated probe having an elongated generally cylindrical heater member seated in a central well in an elongated corrosion resistant outer body with a space therebetween filled with a highly conductive material, the outer body having an open first end and a closed second end which forms a pointed tip, the space between the heater member and the outer body including a generally conical shaped portion between the pointed tip end of the outer body and the heater member which has a generally flat adjacent end, the heater member having an electrical heating element extending from external leads through the open first end of the outer body and through a heat transfer material in a generally cylindrical casing, comprising the steps of: (a) inserting a predetermined quantity of highly conductive material into the well in the outer body, (b) heating the outer body in an upright position until the highly conductive material melts and fills the said generally conical shaped portion of the space adjacent the pointed tip end of the outer body, (c) assembling the heater member into a seated position in the well in the outer body with a quantity of highly conductive material located adjacent the first end of the outer body, (d) heating the assembly in an upright position under partial vacuum until the highly conductive material melts and flows downward to substantially fill the space between the heater member and the outer body, and (e) allowing the assembly to cool to solidify the highly conductive material, thereby forming an integral unit.

Further objects and advantages of the invention will appear from the following description taken together with the accompanying drawings.

BRIEF DESCRIPTION OF THE DRAWINGS

FIGS. 2–5 illustrate a sequence of steps in manufacturing the heated probe according to a preferred embodiment of the invention.

DESCRIPTION OF THE PREFERRED EMBODIMENTS

Figure 1:
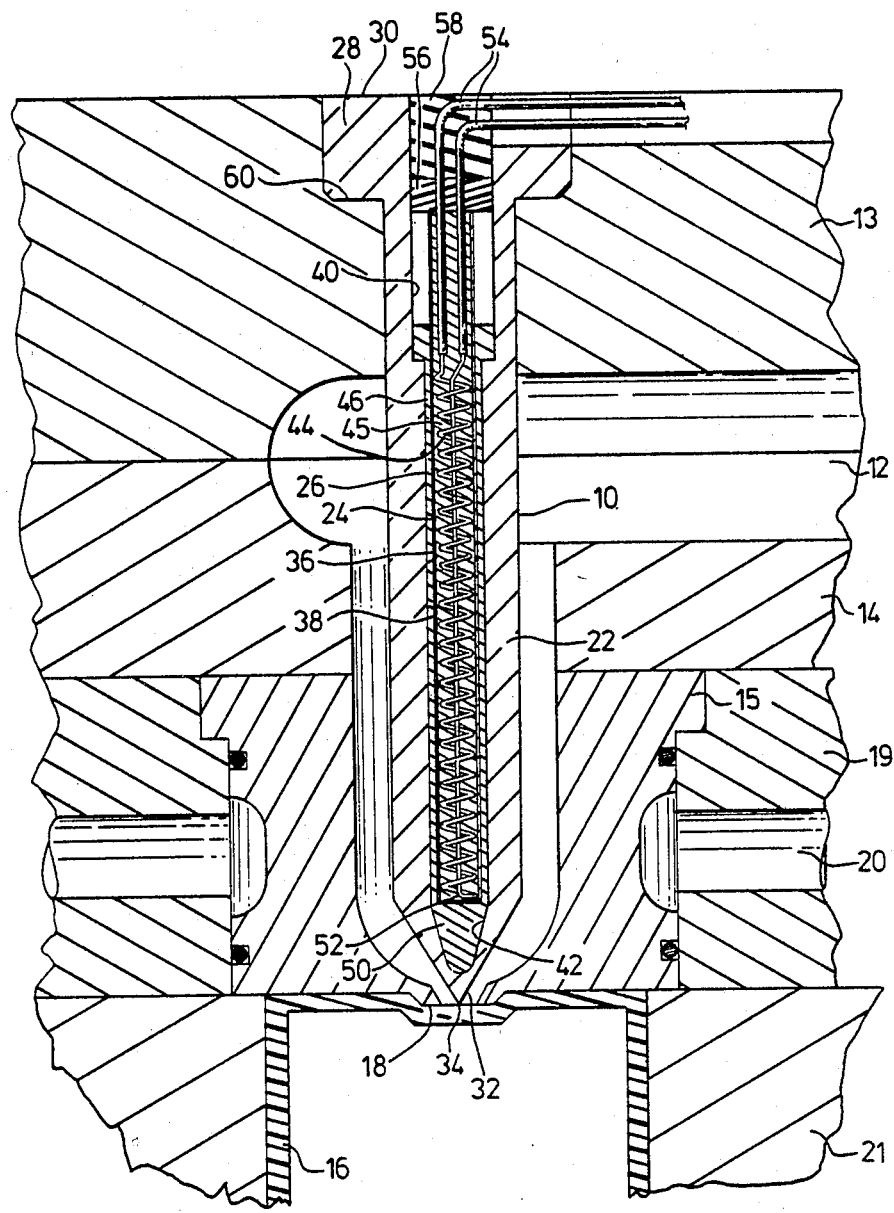
FIG. 1 is a partial sectional view of an injection molding system with a heated probe according to a preferred embodiment of the invention.

Reference is first made to FIG. 1 which shows a heated probe 10 in position in an injection molding system. In this system pressurized melt from a source such as a molding machine (not shown) flows through a hot runner passage 12 extending between a probe retainer plate 13 and a runner plate 14 through a gate insert 15, and into a cavity 16 through a gate 18. The gate insert 15 is held in place by gate insert retainer plate 19 and cooled by water flowing through conduit 20. The cavity plate 21 is similarly cooled by coolant means (not shown). As may be seen, the elongated heated probe 10 is seated in the probe retainer plate 13 to extend into a portion of the hot runner passage where the melt flows longitudinally past the heated probe 10 to the gate 18.

The heated probe 10 has an outer body 22, an inner heater member 24, and a filling of highly conductive material 26 therebetween. The elongated outer body 22 is generally cylindrical with a flanged portion 28 at its first end 30 and a pointed tip 32 at its second end 34. The outer body 22 is hollow to provide a well 36 which extends from the open first end 30 to the closed second end 34. The well has a generally cylindrical wall 38, but it does have an enlarged portion 40 adjacent the first end 30 and a generally conical portion 42 extending into the pointed tip 32 at the second end 34.

The inner heater member 24 is made in a conventional manner with an electrical heating coil or element 44 extending along its length through a heat transfer material 45 in a generally cylindrical outer casing 47. In this embodiment of the invention, the heat transfer material 45 is magnesium oxide powder and the heater member 24 is swaged in a conventional manner to compress the magnesium oxide powder around the heating element 44.

As may be seen, there is a space 46 between the heater member 24 and the outer body 22 which is filled with a highly conductive material 26. The portion 48 of the space 46 between the cylindrical outer casing 47 of the heater member 24 and the cylindrical wall 38 of the well 36 is just large enough to provide clearance for insertion of the heater member 24 into the well 36. A further generally conical shaped portion 50 of the space 46 is formed where the end 52 of the heater member 24 which is substantially flat will not fit into the conical portion 42 of the well 36. All of this space 46 is filled with a highly conductive material 26, which greatly facilitates the transfer of heat between the heater member 24 and the outer body 22, particularly to the pointed tip 32 of the outer body 22. In this embodiment, the highly conductive material 26 is copper and the outer body 22 is formed of stainless steel.

The electrical heating element 44 of the heater member 24 connects to leads 54 which extend through a ceramic cap 56 and out through a rubber seal 58 to an external source of electric power (not shown). The ceramic cap 56 which abuts against one end of the heater member 24 to provide a degree of insulation therefrom is covered by rubber seal 58 which is seated in the enlarged portion 40 of the well 36 at the first end 30 of the outer body 22. The back plate 13 has a seat 60 which receives the flanged portion 28 of the outer body 22 in a position wherein the heated probe 10 is centered in the hot runner passage 12 and the pointed tip 32 is the desired distance from the gate 18. The heated probe 10 is secured in this position by conventional means (not shown).

In use, molding commences after the system has been assembled with one or more cavities, as described above. Pressurized melt supplied from a molding machine flows through the hot runner passage 12 where it passes along the outside of the heated probe 10. Heat from the heated probe 10 maintains the melt in a molten state until it flows past the pointed tip 32 of the outer body 22, through the gate 18 and into the cavity 16. When the cavity is filled, flow ceases and the pressure is relieved, the gate freezes over and the mold is opened to eject the molded product. The mold is then closed, melt pressure reapplied so that melt flows along the hot tip into the cavity and the process is repeated.

Referring to FIGS. 2-6, a method according to a preferred embodiment of the invention will now be described involving a sequence of steps for making a heated probe 10, as described above. As seen in FIG. 2, a cylindrical slug 62 of a predetermined amount of copper is inserted into the well 36 in the outer body 22. The outer body is then heated under a partial vacuum in an upright position in the vacuum furnace 64 seen in FIG. 6 to a temperature sufficient to melt the copper. The amount of copper is selected to fill the conical shaped portion 50 of the space 46 adjacent the pointed tip end 32 of the outer body 22. Filling the conical shaped portion 50 under a partial vacuum results in the copper fusing to the stainless steel of the outer body 22, thus providing a bond between them with excellent heat transfer characteristics.

Figure 6:
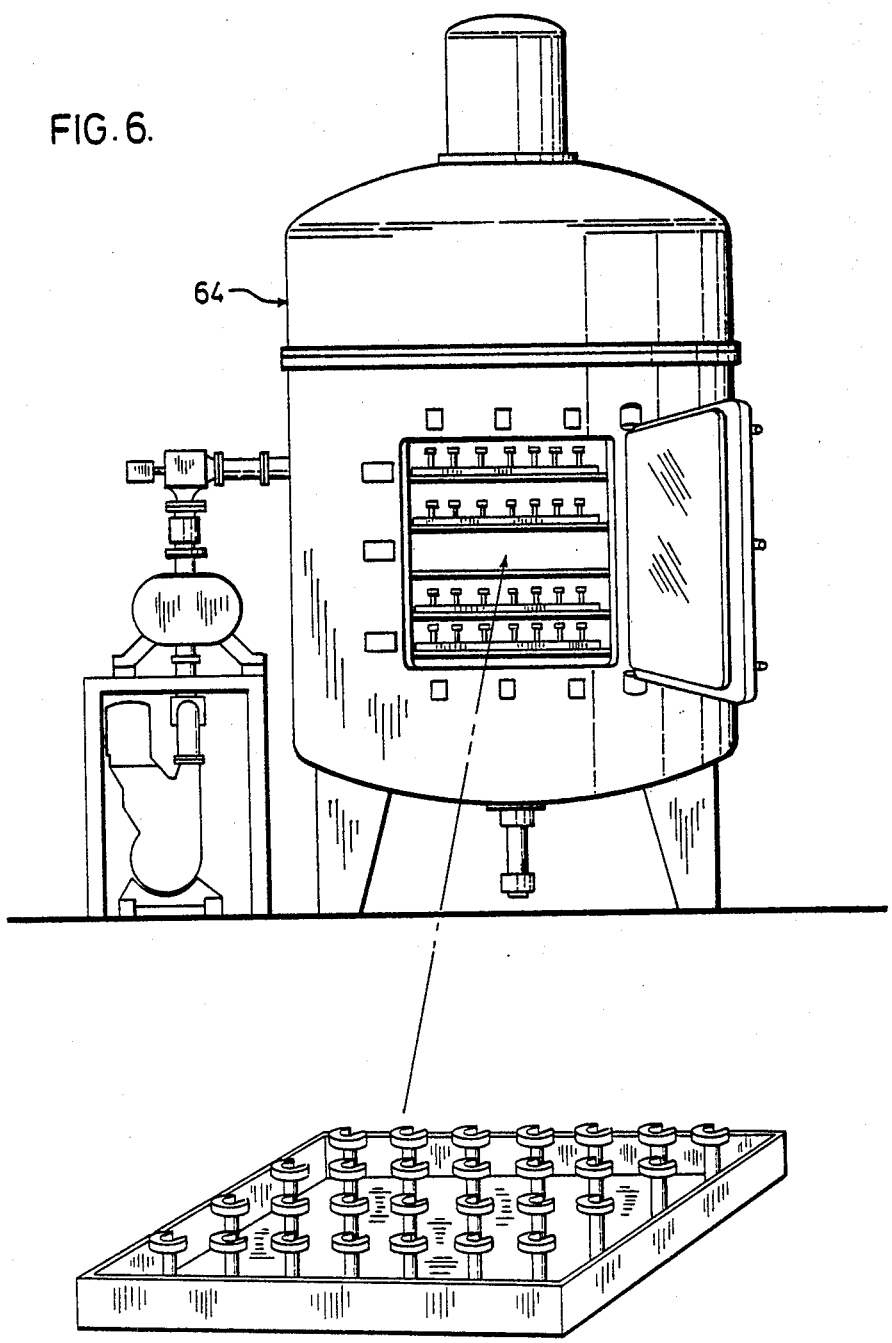
FIG. 6 shows a tray of assemblies ready for insertion into a vacuum furnace.

After the outer body 22 is removed from the furnace, a sleeve 66 of a predetermined amount of copper is seated on the enlarged portion 40 of the well 36. As seen in FIGS. 3 and 4, the inner heater member 24 is then inserted into the well 36 through the sleeve 66 until its flat end 52 abuts against the copper in the well. The ceramic cap 56 is then added and fixed in position against the heater member 24. The assembly is then again inserted into the vacuum furnace 64 and heated in an upright position under a partial vacuum in the presence of an inert gas until the copper sleeve 66 melts and runs down between the cylindrical outer casing 47 of the heater member 24 and the cylindrical wall 38 of the well 36. The previously inserted copper melts again and the newly added copper fuses to it as well as to the outer casing 47 and the wall 38 of the well 36. In addition to providing an improved bond between the materials, this vacuum filling ensures that the copper runs into all of the openings and displaces the air to avoid insulative air spaces remaining beneath or around the heater member 24. As seen in FIG. 5, an air space 68 is left by the copper running down around the heater member 24, but its insulative effect is not a problem because it is near the first end 30 where maximum heat transfer is not normally required. In fact, it assists the ceramic cap 56 in preventing excessive heat loss from that end of the heater member 24. After the copper melts and runs down, the assembly is removed from the furnace and allowed to cool to solidify the copper to provide an integral heated probe 10. Then a silicone rubber seal 58 is applied to keep moisture out. While this description is given in regard to a single unit, in practice production is in batches, as shown in FIG. 6.

Although the description of this invention has been given with respect to preferred embodiments, it is not to be construed in a limiting sense. Variations and modifications may now occur to those skilled in the art. For a definition of the invention reference is made to the appended claims.

What I claim is:

1. An integral elongated heated probe to extend centrally into a portion of a hot runner passage wherein pressurized melt flows longitudinally past the probe to a gate leading to a cavity, the elongated heated probe comprising:

(a) an elongated hollow outer body having first and second ends, the body member defining a well extending from the first end to an enclosed pointed tip extending in the direction of flow at the second end, the well having a generally cylindrical inner wall, but ending at a generally conical portion adjacent the tip at the second end, the first end having means for locating the heated probe in position extending into the hot runner passage;

(b) an elongated inner heater member seated in the well in the outer body, the heater member having an electrical heating element connected to external lead means, the heating element extending through a heat transfer material in a generally cylindrical outer casing, the outer casing having a slightly smaller outside diameter than the inside diameter of the inner wall of the well in the outer body thereby forming a space therebetween; and (c) a highly conductive material substantially filling the conical portion of the well adjacent the tip of the outer body and the space between the outer casing of the heater member and the inner wall of the well.

2. A heated probe as claimed in claim 1 wherein the lead means extend from the electrical heating element in the heater member, through a ceramic cap located in the well adjacent one end of the heater member, and out through a rubber seal located in the well adjacent the ceramic cap at the first end of the outer body.

3. A heated probe as claimed in claim 1 wherein the electrical heating element extends substantially along the whole length of the heater member.

4. A heated probe as claimed in claim 1, 2 or 3 wherein the highly conductive material is a copper alloy.

5. A heated probe as claimed in claim 1, 2 or 3 wherein the outer body is formed of stainless steel.

* * * * *